(No Model.) 4 Sheets—Sheet 1.
S. E. HAKE.
COTTON SEED PLANTER.
No. 384,314. Patented June 12, 1888.
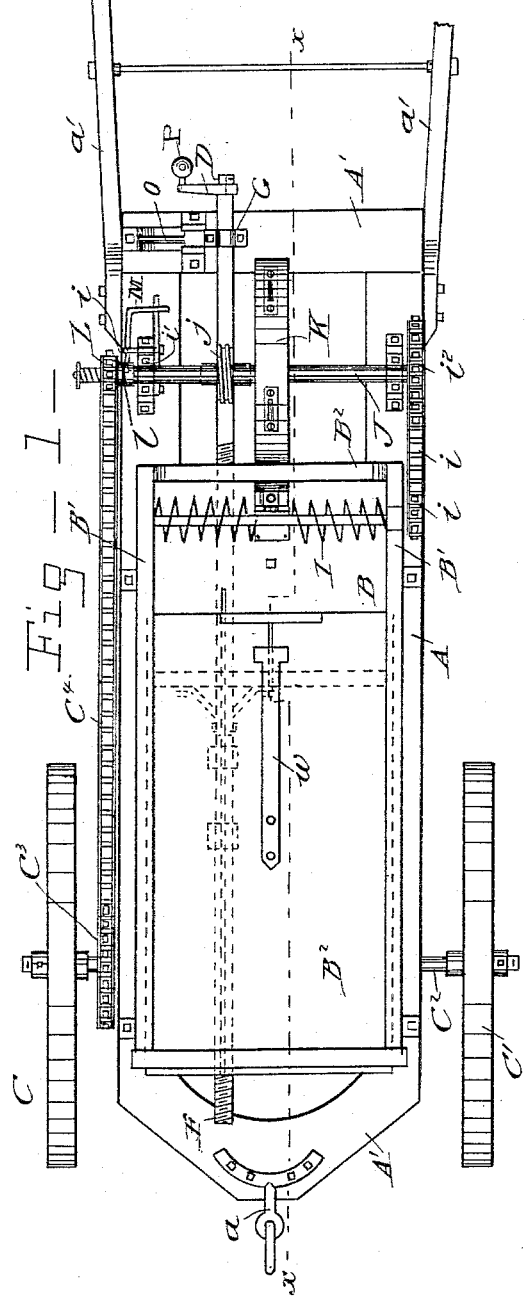
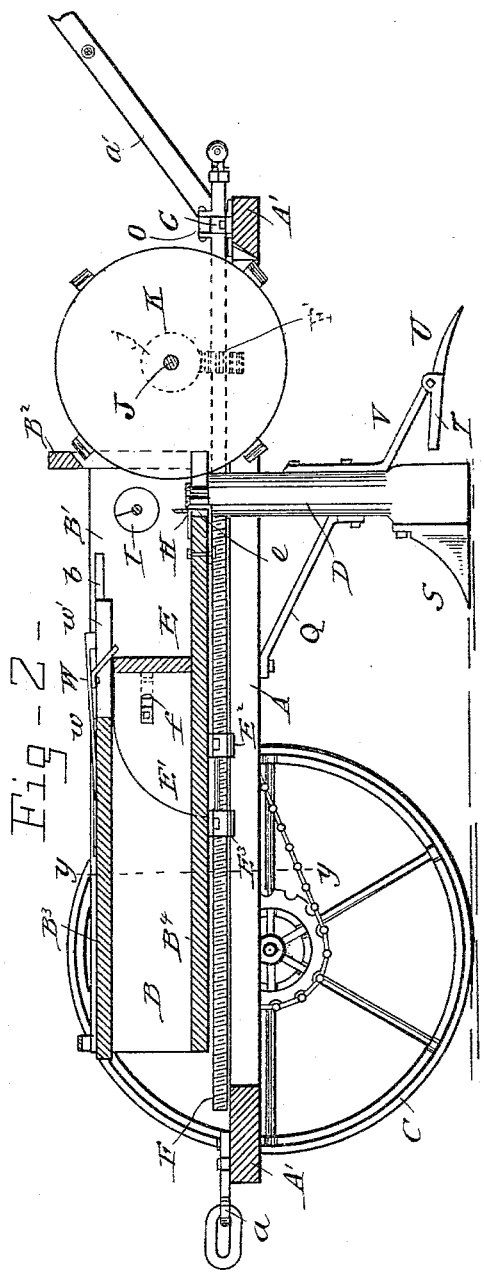
Witnesses.
Van Buren Hillyard,
G. P. Kramer.
Inventor.
Samuel E. Hake.
By R. S. & A. P. Lacey.
Attys.

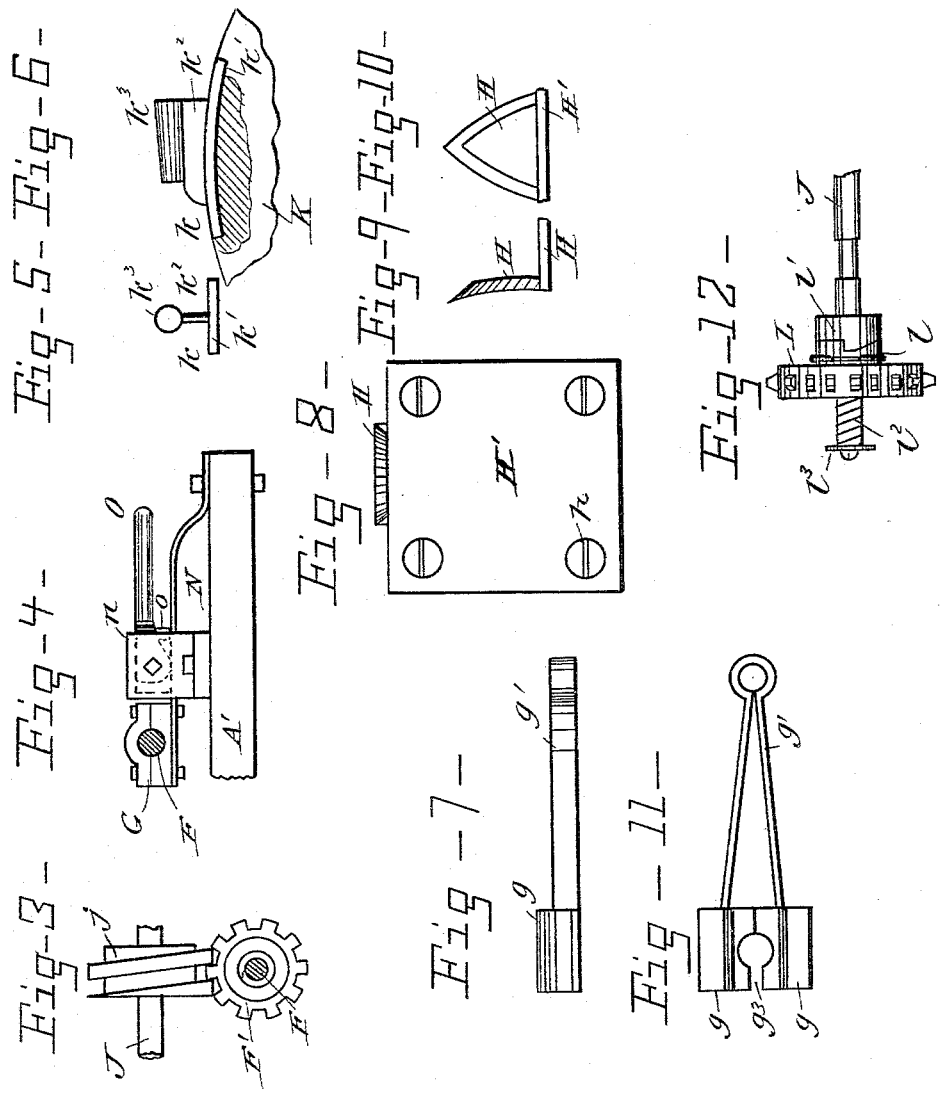

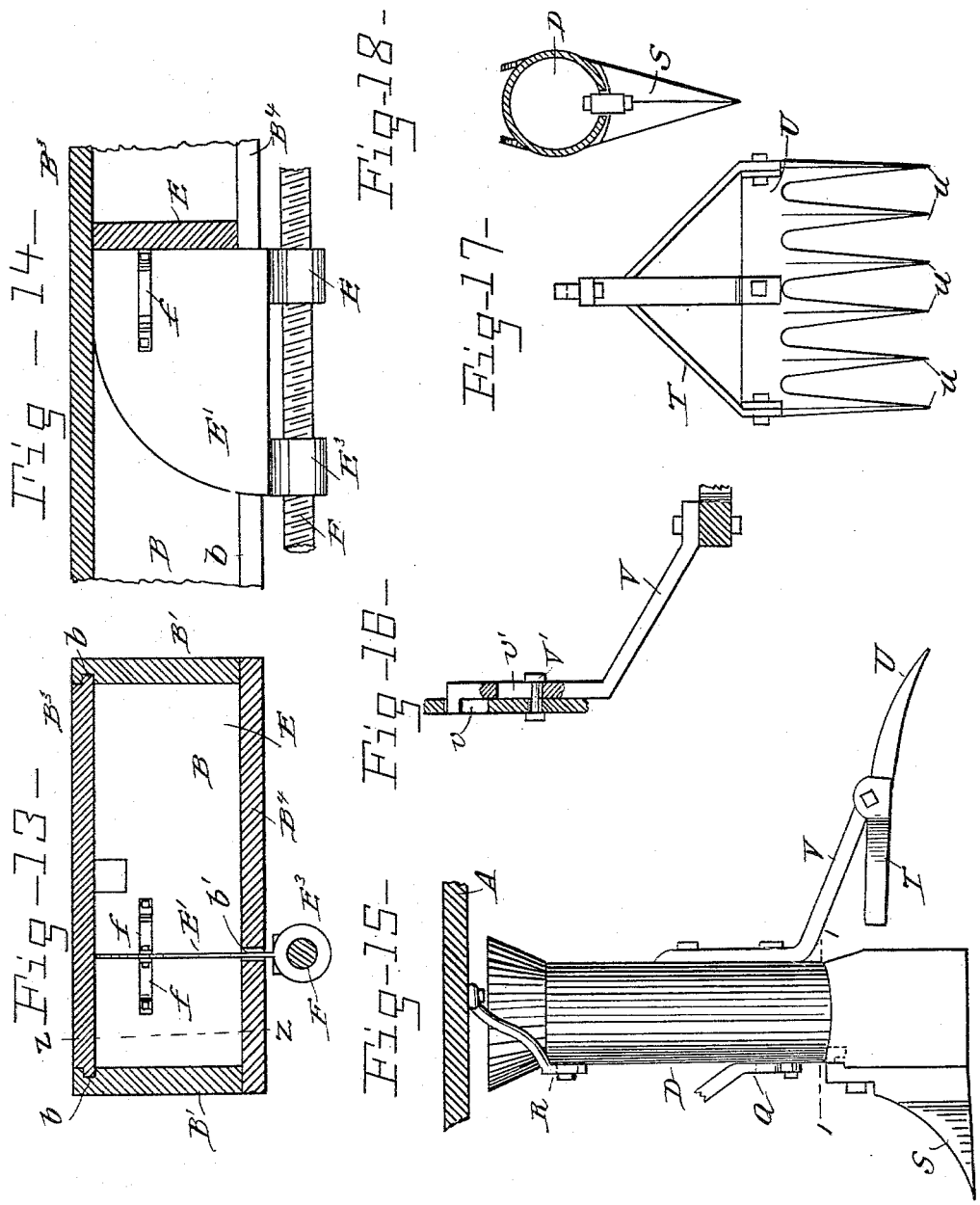

(No Model.) 4 Sheets—Sheet 4.
S. E. HAKE.
COTTON SEED PLANTER.
No. 384,314. Patented June 12, 1888.
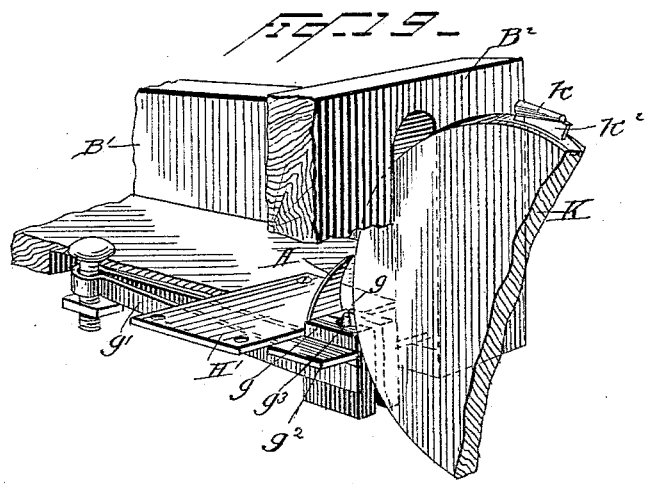
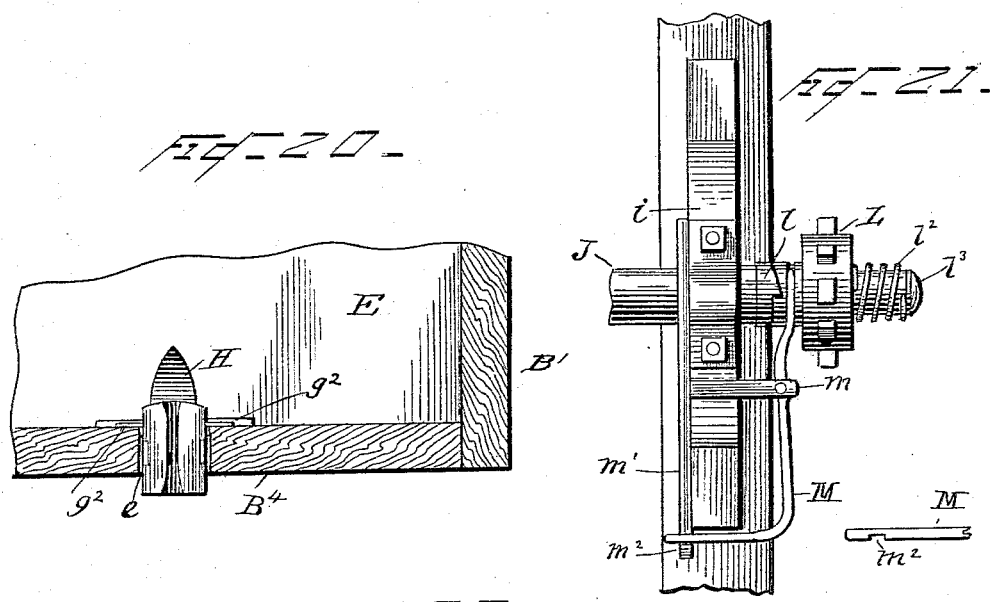
WITNESSES.
Norris A. Clark.
Van Buren Hillyard.
INVENTOR.
Samuel E. Hake.
By R. S. & A. P. Lacey
attys.

UNITED STATES PATENT OFFICE.

SAMUEL E. HAKE, OF YOUNGSTOWN, OHIO.

COTTON-SEED PLANTER.

SPECIFICATION forming part of Letters Patent No. 384,314, dated June 12, 1888.

Application filed February 7, 1888. Serial No. 263,245. (No model.)

*To all whom it may concern:*

Be it known that I, SAMUEL E. HAKE, a citizen of the United States, residing at Youngstown, in the county of Mahoning and State of Ohio, have invented certain new and useful Improvements in Cotton-Seed Planters; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to cotton-seed planters, and has for its object to simplify this class of agricultural implements and produce a planter which will be compact in construction and arrangement, adjustable and accessible in all its parts, durable and efficient in use, and not liable to get out of repair.

The cotton seed are forcibly discharged from the hopper through a grain-tube, which is made of two parts yieldingly held together, so as to accommodate itself to the bulk of grain passing through said tube. The seed are directed to said grain-tube by a knife guard, which at the same time cuts through the fibrous covering inclosing the seed, so that when the seed is planted it will ripen and take root quicker than when planted by machines as generally constructed. The capacity of the grain-hopper can be adjusted at will, either by hand or automatically, to accommodate the bulk of grain placed therein. The automatic adjustment is for the purpose of compensating and allowing for the discharge of the seed, so that the hopper will remain relatively full. The seed are fed from opposite sides of the hopper to the discharge-opening by a feed-shaft having a right and left feed-spiral. The wall or partition by which the capacity of the hopper is regulated is adjusted by a threaded shaft which can be thrown in and out of gear with the driving mechanism for operating said shaft independently of the driving mechanism or quickly running the said wall or partition back when it has been advanced to its utmost limit. The cover of the hopper has a stop which normally projects within the path of the said wall or partition, and which, engaging with said cover, carries the cover back with it.

The covering and cultivating attachment is of peculiar construction. The coverer is followed by the cultivating device, which gives the row in which the seed is planted a rounded appearance and at the same time loosens the earth.

The improvements consist in the novel construction and combination of parts, which will be more fully hereinafter set forth and claimed, and shown in the accompanying drawings, in which—

Figure 1 is a plan view of a planter embodying my invention; Fig. 2, a longitudinal vertical section on the line X X of Fig. 1; Fig. 3, a detail view of the threaded and counter shafts and the gearing connecting said shafts; Fig. 4, a detail side view of the adjustable bearing which supports the outer end of the threaded shaft, the spring supporting said bearing, and the cam-lever for depressing the spring for disconnecting the gearing which transmits motion from the counter-shaft to the threaded shaft; Fig. 5, a front view of the feed-tappet; Fig. 6, a side view of a portion of the feed-tappet wheel, showing the feed-tappet in position and in side elevation; Fig. 7, a side view of the grain-tube and its spring-support; Fig. 8, a plan view of the plate and the combined knife guard and guide; Fig. 9, an edge view of the plate, parts being broken away, and showing the combined knife guard and guide; Fig. 10, a front view of the combined knife guard and guide and the plate, having a portion broken away; Fig. 11, a plan view of the grain tube and the spring-support; Fig. 12, a detail view of one end of the counter-shaft, showing the mechanism for throwing it in and out of gear; Fig. 13, a cross-section of the hopper, on an enlarged scale, about on the line Y Y of Fig. 2; Fig. 14, a detail sectional view about on the line Z Z of Fig. 13; Fig. 15, a detail side view of the grain-spout, showing the opener and the combined covering and cultivating attachment; Fig. 16, a detail side view of the brace which connects the combined cultivating and covering attachment with the grain-spout; Fig. 17, a plan view of the combined covering and cultivating attachment; Fig. 18, a cross-section of the grain-spout on the line 1 1 of Fig. 15; Fig. 19, a perspective view of front end of hopper, showing discharge-opening, yielding grain-tube, and combined knife guard and guide; Fig. 20, a cross-section of bottom of hopper just in front of the grain-tube; Fig. 21, a detail plan view of clutch and the shipper-lever for throwing said clutch out of gear; Fig. 22, a front view of cultivating attachment.

The frame of the machine, composed of the side sills, A, and the end sills, A', carries the hopper B, and is mounted upon the drive-wheels C and C' and the grain-spout D. Draft is applied to the planter by means of the clevis a, fastened to the front end bar, A', of the frame, and it is guided in its movements by the handles a', secured to the rear ends of the side sills, A. The hopper B, comprising bottom $B^4$, sides B', closed end $B^2$, and the sliding top $B^3$, having its edges rabbeted and fitted in the grooves b near the upper edges of the sides B', has an adjustable wall or partition, E, which is adapted to be moved for regulating the capacity of the hopper. This wall or partition E extends between the bottom, top, and sides of the hopper and is provided with an extension, E', which projects through a narrow slot, b', in the bottom $B^4$ and terminates below the hopper in the threaded socket $E^2$, which is engaged by the threaded rod or shaft F, extending longitudinally of the hopper, and journaled at its rear end in the bearing G. The extension E' is made very thin, so that the slot b' may be as narrow as possible to prevent the cotton-seed from dropping through or lodging in the said slot, and it extends the full length of the wall E to brace the same and prevent the wall tipping back. The extension E' is of considerable length, and is provided with a second threaded socket, $E^3$, which is likewise engaged by the threaded rod or shaft F. The braces f—one on each side of the extension E'—strengthen the connection between the wall or partition E and the said extension, and maintain the wall or partition parallel with its first position at any and all of its adjustments. The bottom of the hopper near its rear end has the discharge-opening e, within which is located the adjustable or yielding grain-tube composed of the two corresponding parts g g, which are supported on the ends of the V-shaped spring g'. The upper edges of the parts g of the grain-tube have outer flanges, $g^2$, which overlap and rest upon the bottom $B^4$ on each side of the opening e to support them on the said bottom $B^4$. The spring holds the parts of the said grain-tube yieldingly together, so they can separate and adapt themselves to the bulk of grain passing between them.

The double-edged-knife guard and guide H is arranged directly in front of the grain-tube and curves slightly toward the rear of the machine. Its edges converge from bottom to top, forming a triangular-shaped blade having its its apex or point directly in the line of separation between the two parts g. The knife guard and guide H projects upward from the rear edge of the plate H', and is fastened to the bottom of the hopper by suitable means, as the screws h.

The feed-shaft I, arranged above the grain-discharge and knife guard and guide, is journaled in the sides of the hopper, and has one of its journals projected beyond the side of the hopper and provided with the sprocket-wheel i, which receives its motion from the counter-shaft J, journaled in the rear of the hopper, by the sprocket-chain i', passing around the sprocket-wheel i, and a corresponding sprocket-wheel, $i^2$, mounted on the end of counter-shaft J. This feed-shaft is provided with a right and left feed spiral, each extending about half the length of the shaft to feed the seeds from the sides of the hopper toward the middle or to the grain-discharge opening.

The feed-wheel K, provided at intervals around its periphery with the feed-tappets k, is mounted on the counter-shaft J. There may be as many of these feed-tappets as desired, and the greater the number the closer the cotton will be planted, and the less the number the farther apart will the cotton be planted, provided the diameter of the feed-wheel remains the same. The feed-tappets k are alike, and a description of one will suffice for all. They are each composed of a plate, k', conforming to the curvature of the periphery of the feed-wheel K, a web portion, $k^2$, and a head or plunger, $k^3$, which tapers in cross-sectional area from front to rear. The end $B^2$ of the hopper is slotted to permit the edge of the feed-tappet wheel to work through it and the feed-tappets to work through the grain-tube, the opposing edges of the rear portion of the parts g being removed to leave a space, $g^3$, for the passage of the web $k^2$ of the feed-tappets.

The worm j on shaft J, meshing with the worm-pinion F' on the threaded shaft F and mounted on the counter-shaft J, transmits motion from said counter-shaft to the threaded shaft F.

The pinion L, having a clutch, l, on its side and mounted on the counter-shaft J, and having a limited longitudinal movement on said counter-shaft, is adapted to engage with a corresponding clutch, l', keyed on the counter-shaft, and cause the pinion and counter-shaft to revolve together. The spring $l^2$, placed on the end of the counter-shaft and confined between the stop $l^3$ and the pinion, holds the clutch of said pinion in engagement with the clutch l'. The clutches l and l' are disengaged by the shipper-lever M, supported at or near its middle on the arm m, extending from the bar m', and having its outer end forked and adapted to bear on the pinion on each side of counter-shaft, and having its inner end bent at right angles and provided with the notch $m^2$, which is adapted to fit over the bar m' and hold the clutches disengaged.

The wheel C is keyed to the axle $C^2$, and the sprocket-wheel $C^3$, mounted on said axle and communicating motion to the counter-shaft by having the sprocket-chain $C^4$ passing around the sprocket-wheel C³ and the pinion L, is the means of transmitting motion to the operating parts of the machine from the axle.

The bearing G—a two-part box—is mounted on the end of the spring N, which passes between the standards n, and has a limited vertical movement to throw the gearing j and F' in and out of gear when it is desired to rotate the threaded shaft F independently of the counter-shaft for adjusting the wall or partition E. The spring N is sufficiently stiff to normally hold the shaft F up and the gearing j and F' in mesh, and it is compressed to disengage the gearing j and F' by the cam-lever O, pivotally supported between the standards n, and turned down in the position shown most clearly in Fig. 4, and limited in said movement by the stop o.

The threaded shaft F extends beyond the bearing toward the rear of the machine, and has a crank, P, fitted to its end, by which it can be turned for adjusting the wall E independently of the counter-shaft.

The grain-spout D is braced by the stays Q and R, and has slots q and r, through which bolts pass and adjustably connect the spout with said stays, respectively.

The ground furrow or opener S is secured to the lower end of the grain-spout, which is open in the rear directly opposite the opener to permit the escape of the seed.

The coverer T is a triangular-shaped frame having the cultivating attachment U secured thereto. This cultivating attachment U is curved from end to end, and is designed to give the row in which the seed is planted a rounded appearance. The fingers u, curving from front to rear and forming part of the attachment U, loosen the earth after the seed is covered. The bracket V, bolted to the combined covering and cultivating attachment, has its upper end bent to enter a slot, v, in the grain-spout, and is secured thereto by the bolt V', passing through a slot, v', in the said bracket V. By loosening bolt V' the bracket V can be raised and lowered to adjust the level of the combined covering and cultivating attachment.

The seed to be planted is placed in the hopper between the wall or partition E and the closed end B², and the sliding cover B³ is pushed in as far as practicable to nearly close the hopper. Motion being imparted to the machine as it is drawn over the field, the several parts, through the mechanism hereinbefore described, will be set in operation, the wall or partition E will be gradually advanced toward the end B² to reduce the capacity of the hopper proportionately as the seed is discharged, and the tappets will successively force the seed through the grain-tube and into the grain-spout, where it will be deposited in the furrow made by the opener S and subsequently covered. The seed will be fed from each side of the hopper toward the discharge-opening, and when engaged by the tappets will be forced against the edge of the knife H, which will partially separate or cut through the fiber surrounding the seed, which, when planted, will sprout quicker than if the said covering remained unbroken, inasmuch as the moisture has freer access to the seed and will ripen it in less time.

The planting mechanism can be thrown in and out of gear at will by the shipper-lever M, and the threaded shaft can be thrown out of mesh with the counter-shaft by the cam-lever O, to permit the independent operation of the threaded shaft F for adjusting the wall or partition E, particularly for running said wall back after a hopper full of seed has been planted. During the retrograde movement of the said wall E it engages with a yielding stop, W, depending from the cover B³, and carries the cover back with it. This stop is carried by a spring, w, resting on and secured to the cover B³, and it extends and works through a slot, w', in the cover, the spring having its end widened to overlap the edges of said slot w' to limit the downward movement of the said stop W, which is inclined to ride over the wall E when the cover is pushed back by hand.

Having thus described my invention, what I claim, and desire to secure by Letters Patent, is—

1. In a planter, the combination of the hopper having a slot in its end and bottom and having a discharge-opening in its bottom communicating with the said slots, the partition E, means for automatically moving said partition to reduce the capacity of the hopper and force the seed to the said discharge opening, the feed-shaft having a right and left spiral to feed the seed from the sides of the hopper to the said discharge-opening, and the feed-wheel having its edge adapted to work through the said slots and discharge opening, substantially as and for the purpose described.

2. The combination, with the hopper, of the grain-tube made in two corresponding parts, each part having a corresponding vertical groove, and the spring for yieldingly holding the said parts together, and the feed-wheel having feed-tappets which are adapted to work through the said grooves and between the parts of the said grain tube, substantially as and for the purpose described.

3. The combination, with the hopper and the grain-tube having an opening in one side, of the feed-wheel and the feed-tappet having a web portion to fit in the opening and a head or plunger to work through the said grain-tube, substantially as described.

4. The combination, with the hopper having a grain-discharge opening and the feed-wheel, of the feed-tappet having a web portion and a head or plunger which tapers in cross sectional area from end to end, substantially as set forth.

5. The herein-shown and described feed-tappet, composed of a base-plate, a web portion, and a head or plunger.

6. The combination, with the hopper having a discharge-opening and the feed-wheel, of the double-edged-knife guard extending vertically in the said hopper, substantially as described, and for the purpose specified.

7. The combination, with the hopper and the adjustable wall or partition, of the extension having a threaded socket and the threaded rod engaging with said socket, substantially as described.

8. The combination, with the hopper having a narrow slot in its bottom, the wall E, the wide extension E', extending through the said slot and having a threaded socket at its lower end below the hopper, of the braces $f$ and the threaded rod engaging with the said socket, substantially as specified.

9. The combination, with the hopper and the adjustable wall or partition, of the sliding cover having a stop projecting within the path of the said wall, substantially as described, for the purpose specified.

10. The combination, with the hopper and the adjustable wall or partition, of the sliding cover, the stop set at an incline to the said wall, and the spring secured to the cover at one end and having the stop secured to its free end, substantially as described.

11. The combination, with the hopper, the adjustable wall or partition, and the threaded shaft for adjusting the said wall or partition, of the counter-shaft, the gearing for imparting motion from the counter-shaft to the threaded shaft, and the adjustable bearing having the outer end of the threaded shaft journaled therein, whereby the said counter and threaded shafts may be thrown in and out of gear at will, substantially as and for the purpose described.

12. The combination, with the hopper, the adjustable wall, the threaded shaft, the counter-shaft, and the gearing connecting the counter and threaded shafts, of the adjustable bearing G, having the outer end of the threaded shaft journaled therein, the spring, and the cam-lever for compressing the spring, having the said bearing mounted on its outer end and throwing the said counter and threaded shafts out of gear, substantially as described, for the purpose specified.

13. In a cotton-planter, the combination, with the frame and the grain-spout, of the braces Q and R, adjustably connecting the grain-spout with said frame, substantially as shown and described.

14. In a cotton-planter, the combination, with the grain-spout having a slot in its side, of the combined coverer and cultivator, the bracket V, having a slot and having its upper end bent at right angles to enter the slot in the grain-spout, and the bolt $v'$, adjustably connecting the bracket with the grain-spout, substantially as set forth.

15. The combination, with the hopper, the adjustable wall or partition, the threaded shaft, the counter-shaft, and the gearing connecting the threaded and counter shafts, of the adjustable bearing G, having the outer end of the threaded shaft journaled therein, the clutch $l'$, the pinion L, having clutch $l$, and the shipper-lever for throwing the clutches $l$ and $l'$ out of gear, substantially as and for the purpose described.

In testimony whereof I affix my signature in presence of two witnesses.

SAMUEL E. HAKE.

Witnesses:
L. W. WOODWORTH,
JOHN A. LADD.